United States Patent [15] 3,665,327

Prentky et al. [45] May 23, 1972

[54] NOISE DISCRIMINATOR FOR DIGITAL DATA DETECTION SYSTEM

[72] Inventors: Peter I. Prentky, Los Gatos; Alonzo A. Wilson, San Jose, both of Calif.

[73] Assignee: International Business Machines Corporation, Armonk, N.Y.

[22] Filed: Nov. 14, 1969

[21] Appl. No.: 876,948

[52] U.S. Cl. ..............................328/163, 328/114, 307/263
[51] Int. Cl. ..............................H03k 5/12
[58] Field of Search ..............................328/163, 328, 307, 114; 307/263

[56] References Cited

UNITED STATES PATENTS

| | | | |
|---|---|---|---|
| 2,759,047 | 8/1956 | Meacham | 328/164 |
| 2,942,192 | 6/1960 | Lewis | 328/164 |
| 3,243,580 | 3/1966 | Welsh | 235/61.11 |
| 3,271,750 | 9/1966 | Padalino | 340/174.1 |

OTHER PUBLICATIONS

IBM Technical Disclosure Bulletin, Vol. 9, No. 8, January 1967, p. 985, " Pulse Discriminating Latch"

*Primary Examiner*—Donald D. Forrer
*Assistant Examiner*—Harold A. Dixon
*Attorney*—Hanifin & Jancin and Nathan N. Kallman

[57] ABSTRACT

In a digital data detection system in which a readout signal derived from a magnetic recording of the data in encoded form is differentiated to identify the various data and clock bits represented by the peaks thereof, a discriminator is provided for eliminating shoulder noise pulses from the differentiated signal prior to the separation of the various zero-crossings thereof into "ones" and "zeros" at the output. The discriminator includes two symmetrical complementary channels through which the data and clock bits are alternately passed. The data and clock bits are delayed at the channel inputs for a period of time at least equal to the duration of the shoulder noise pulses to eliminate those noise pulses which occur prior to a valid date or clock bit. Each channel is inhibited for a selected period of time after the occurrence of a valid data of clock bit therein to eliminate noise pulses occuring subsequent to the valid bits.

15 Claims, 9 Drawing Figures

INVENTORS.
PETER I. PRENTKY
ALONZO A. WILSON
BY Fraser and Bogucki
ATTORNEYS

INVENTORS.
PETER I. PRENTKY
ALONZO A. WILSON
BY Fraser and Bogucki
ATTORNEYS

INVENTORS.
PETER I. PRENTKY
ALONZO A. WILSON
BY *Fraser and Bogucki*
ATTORNEYS

INVENTORS.
PETER I. PRENTKY
ALONZO A. WILSON
BY Fraser and Bogucki
ATTORNEYS

Patented May 23, 1972 3,665,327

8 Sheets-Sheet 5

INVENTORS.
PETER I. PRENTKY
ALONZO A. WILSON
BY Fraser and Bogucki
ATTORNEYS

INVENTORS.
PETER I. PRENTKY
ALONZO A. WILSON
BY Fraser and Bogucki
ATTORNEYS

INVENTORS.
PETER I. PRENTKY
ALONZO A. WILSON
BY *Fraser and Bogucki*
ATTORNEYS

INVENTORS.
PETER I. PRENTKY
ALONZO A. WILSON
BY Fraser and Bogucki
ATTORNEYS

NOISE DISCRIMINATOR FOR DIGITAL DATA DETECTION SYSTEM

BACKGROUND OF THE INVENTION

1. Field of the Invention

The present invention relates to digital data detection systems, and more particularly to systems of the type in which the transitions or zero-crossings of a magnetic recording of binary data in encoded form are sensed and separated to identify the various "ones" and "zeros" present.

2. Description of the Prior Art

A variety of techniques are available for detecting data which is in digitally encoded form. The particular technique used depends on a number of factors including the type of encoding employed.

Certain types of encoding such as phase modulation denote data by the sense of signal transitions within a succession of arbitrarily defined bit cells. Other types of encoding such as NRZI, double frequency (DFE) which is a form of frequency modulation, and modified frequency modulation (MFM) represent data by the presence or absence of transitions at the centers of the bit cells. In modified frequency modulation, for example, which type of encoding is disclosed in U.S. Pat. No. 3,500,385, and assigned to the assignee of the present invention, a transition is written at the center of each bit cell representing a "one". Transitions are written at the leading edges of bit cells representing a "zero" unless preceded by a bit cell in which a "one" is written. Data encoded in this fashion is readily detected by arrangements in which peak pulses corresponding to the various transitions of the data signal are selectively gated, the "one" or data pulses at the centers of the bit cells being gated to the output to the exclusion of "-zero" or clock pulses at the edges of the bit cell intervals.

Where the data to be detected is recorded on a magnetic medium such as a disk, tape, drum, strip or the like, a magnetic read head is employed to sense the recording and thereby derive a readout signal therefrom. The readout signal which has peaks corresponding to the various transitions of the magnetic recording is differentiated to provide a signal having zero-crossings which correspond to the peaks of the readout signal. The differentiated signal may be shaped if desired to provide a substantially rectangular waveform approximating the actual data signal as recorded on the magnetic medium. The various zero-crossings corresponding to the transitions of the magnetic recording are then separated by appropriate circuitry such as a variable frequency oscillator and included binary trigger into data or "one" bits and clock or "zero" bits depending upon the location of the zero-crossings within the various bit cells.

As the magnetic read head undergoes motion relative to the magnetic recording medium, the magnetic recording is differentiated by the head to provide the readout signal. If a particular transition of the magnetic recording is considered to the exclusion of adjacent transitions, the output signal from the read head which results from the transition and without interference from adjacent transitions comprises a pulse having a peak value at the point of occurrence of the transition and a waveform which slopes to positions of substantially zero value on the opposite sides of the peak in response to the constant values of the magnetic recording on the opposite sides of the transition. Thus if the magnetic transitions are spaced far enough apart, the resulting readout signal comprises a series of spaced apart pulses with the waveform thereof assuming zero value or residing along the zero axis during the intervals in between pulses. In actual practice however the magnetic transitions of the recording are spaced relatively close together to achieve a practical data density, and the read head as it passes over each magnetic transition also senses the adjacent transitions on the opposite sides thereof. This typically results in the readout signal having a waveform which slopes in relatively smooth fashion from each peak through the zero axis to the next peak. Differentiation of the readout signal accordingly provides a signal having zero-crossings at the peaks of the readout signal and a maximum value at the zero-crossing points of the readout signal. Appropriate circuitry may then be employed to generate pulses at each zero-crossing of the differentiated signal, with each of the resulting pulses representing a different transition of the magnetic recording.

Improvements in magnetic recording techniques and in the equipment such as the magnetic heads used therewith have resulted in an increase in resolution or the ability of the magnetic read head to sense each magnetic transition individually with little or no interference from adjacent magnetic transitions. Despite the attendant advantages of such increased resolution, one significant disadvantage has resulted in the readback or detection process. Thus where a pair of adjacent transitions are spaced relatively far apart from one another, the resulting output signal from the read head may return to zero from one peak and remain at zero value for a substantial interval before again increasing to a peak corresponding to the next transition. The resulting shoulder, as it is commonly referred to, when differentiated provides a "shoulder noise pulse" in the form of a dip in the differentiated waveform back toward the zero axis. This noise pulse may be sufficiently large so as to return to the zero axis if the shoulder of the readout signal is large enough. When this occurs the associated circuitry for detecting the zero-crossings of the differentiated signal frequently mistakes the shoulder noise pulse for a zero-crossing resulting in the erroneous generation of a bit signal.

One common technique frequently employed in an attempt to eliminate the effect of shoulder noise pulses and which has been used extensively with NRZI recording involves the use of threshold clipping. A threshold level is incorporated above which the differentiated signal must rise to be detected as a bit. The threshold level should be small enough to include valid signals of reduced or limited amplitude, yet large enough to avoid the shoulder noise pulses.

Threshold clipping is undesirable for a number of reasons. One is the inherent difficulty in maintaining a constant threshold level, even where expensive and complex circuitry is used. A further difficulty lies in the fact that even where the threshold is maintained at a relatively constant and desired level, certain valid signals of relatively small amplitude may be lost while at the same time shoulder noise pulses of sufficiently large amplitude may be erroneously detected.

An alternative measure which is sometimes taken in an attempt to reduce or eliminate shoulder noise pulse problems involves degrading the resolution of the magnetic recording system. Thus if the resolution is degraded to a sufficient extent the shoulder which might otherwise exist between transitions spaced relatively far apart is substantially reduced or eliminated. Resolution may be degraded by a number of techniques including the selection of a read head having particular characteristics, the use of a large write current in making the magnetic recording, the use of an overdamped read head, an increase in the flying height of the read head, and an increase in the actual bit density. Despite the reduction, and in some cases the elimination, of shoulder noise pulse problems, degrading of the resolution of the magnetic recording system is generally undesirable since it decreases the amplitude of the readout signal and often substantially increases bit shift in the readout process.

BRIEF SUMMARY OF THE INVENTION

According to the present invention a noise discriminator is provided for elimination of shoulder noise pulses from a data signal, the discriminator operating in logical fashion and without the need for undesirable techniques such as threshold clipping. The discriminator includes a pair of symmetrical channels coupled to receive true and complementary values of the data signal as provided by a magnetic read head and associated differentiating and squaring circuitry. Recorded readback pulses alternate in polarity, this being inherent in encoding on a medium with a differentiating readback head.

Hence by using a differential amplifier in the linear readback channel, the valid bits are effectively alternated between the two different channels. Utilizing this fact the signals as applied to the channels are delayed by a time period at least equal to the time duration of the noise pulses to eliminate those noise pulses which occur prior to the valid bits. Noise pulses occurring shortly after the valid bits are eliminated by inhibiting the channel outputs for a selected time period. The valid bits appearing at the channel outputs are then separated into "ones" and "zeros".

In one preferred embodiment of a discriminator according to the invention, the data signal at the input of each channel is inverted and applied to two of the three inputs of a first AND gate, both directly and via a first delay circuit which delays the inverted signal by a time T1 at least equal to the noise pulse width. The inverted data signal enables the first AND gate shortly prior to the arrival of each valid bit transition of the delayed signal, thereby passing both the valid bits and noise pulses which occur after the valid bits. The inhibited condition of the first AND gate prior to being enabled, however, blocks noise pulses occurring prior to the valid bits. The data signal at the channel input is also applied to a third input of the first AND gate via a second delay circuit which delays the signal by a time T2 greater than the delay time T1. The signal delayed by the time T2 combines at the first AND gate with the signal delayed by the time T1 to produce a pulse of width T2 – T1 at the output of the first AND gate in response to each valid bit.

Noise pulses which occur after the valid bits and are therefore passed by the first AND gate are eliminated by circuitry which selectively inhibits the channel output and which includes a second AND gate having an input coupled to the first AND gate output, an input coupled to a pulse generator in the form of a single shot circuit, and an output coupled to the channel output as well as to a third delay circuit. The single shot inhibits the second AND gate for a time T3 upon being actuated by each valid bit pulse passed by the second AND circuit and delayed by the third delay circuit a time T4. The inhibit time T3 is chosen so as to safely eliminate any noise pulse which may follow a valid bit pulse passed by the second AND gate without interfering with the following valid bit pulse. The delay T4 insures that the entire valid bit pulse is passed by the second AND gate prior to the gate being inhibited.

In one alternative embodiment of a discriminator according to the invention, each of the pair of complementary channels includes a single AND gate having three inputs, one of which is again coupled to be enabled by the input data signal as inverted. The input signal itself is delayed by a T1 delay circuit prior to being applied to a T2 pulse generator in the form of a single shot circuit. The generator provides a pulse of width T2 to the second input of the AND gate in response to each valid bit transition and each noise pulse. Those generated pulses corresponding to noise pulses which precede valid bit pulses are blocked at the AND gate by the inverted data signal. Generated pulses corresponding to noise pulses which follow valid bit pulses and which otherwise would be passed by the AND gate are blocked by an inhibit pulse of duration T3 provided the third input of the AND gate by a T3 single shot circuit coupled to the input of the T2 single shot in the other channel.

In one modification of the alternative embodiment described above, the T2 single shot circuit is replaced by a second AND gate, an inverter and a T2 delay circuit. The second AND gate has an output coupled to the second input of the first AND gate, a first input coupled directly to the output of the T1 delay circuit, and a second input coupled to the output of the T1 delay circuit through the T2 delay circuit and inverter. The signal from the T1 delay circuit as inverted and further delayed by the time T2 combines at the second AND gate with the signal passed directly from the T1 delay circuit output to produce a pulse having a width T2 in response to each valid bit transition.

BRIEF DESCRIPTION OF THE DRAWINGS

The foregoing and other objects, features and advantages of the invention will be apparent from the following more particular description of preferred embodiments of the invention, as illustrated in the accompanying drawings, in which.

DETAILED DESCRIPTION

Figure 1:
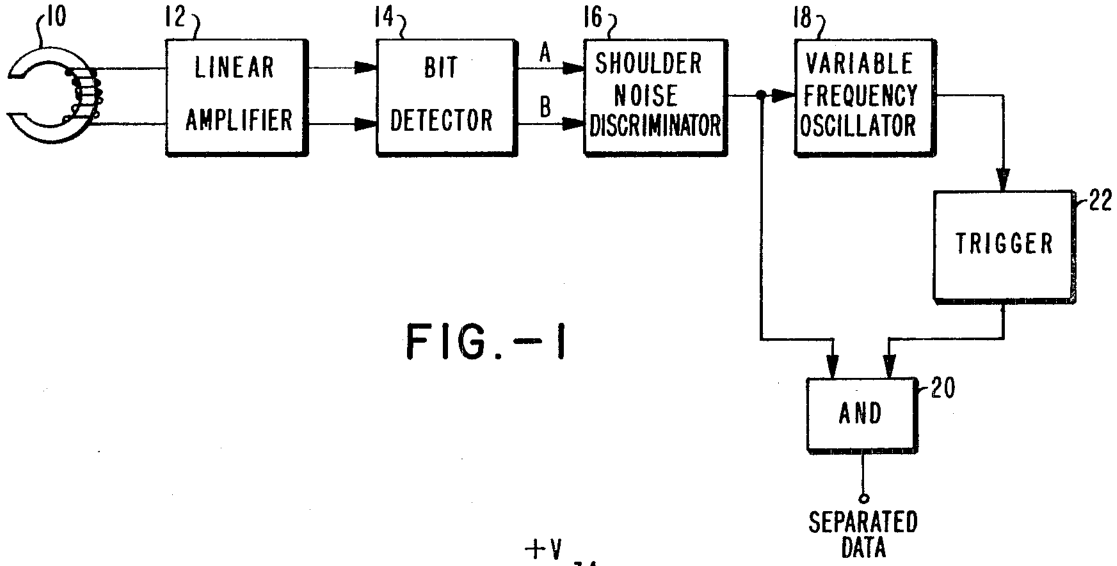
FIG. 1 is a block diagram of a data detection arrangement employing a shoulder noise discriminator according to the invention.

In the arrangement of FIG. 1 a data signal is derived for detection of the digital data carried thereby using a magnetic read head 10. The head 10 undergoes motion relative to a magnetic medium (not shown) which may comprise a disk, tape, drum, strip or the like. Typical magnetic recordings of digital data comprise a succession of transitions of the recording medium between opposite states of magnetic saturation along a track divided into substantially uniform bit cells. The read head 10 provides the true and complementary values of a signal having a succession of peaks corresponding to the magnetic transitions to a linear amplifier 12 for amplification. The amplified signals at the output of the amplifier 12 are then differentiated by the input stage of a bit detector 14 to produce a pair of complementary signals having zero-crossings corresponding to the peaks of the amplified signals at the linear amplifier 12 output. Subsequent stages of the bit detector 14 square the differentiated signals to provide substantially rectangular waveforms corresponding to the magnetic recording to a pair of symmetrical complementary channels within a shoulder noise discriminator 16.

As described in detail hereafter the discriminator 16 delays the squared signals at the input of each channel to eliminate shoulder noise pulses which may occur shortly prior to the bit transitions of the signals, then inhibits the channel outputs to eliminate shoulder noise pulses which may occur shortly after the bit transitions. The discriminator 16 also generates a pulse of selected duration in time coincidence with each bit transition of the squared signals, which pulses are provided to a variable frequency oscillator 18 and to one of the inputs of an AND gate 20. The output of the variable frequency oscillator 18 is coupled to the other input of the AND gate 20 via a binary trigger 22.

The oscillator 18, AND gate 20 and trigger 22 operate in well known fashion to separate "one"bits occurring at the centers of bit cells of the data signal from "zero" bits occurring at the leading edges of the bit cells. The oscillator 18 generates a sawtooth waveform in synchronism with the "one" and "zero" pulses appearing at the output of the discriminator 16, the sawtooth waveform having zero-crossings in time coincidence with the leading and trailing edges of the bit cells as defined by the periodic "zero" or clock pulses. The sawtooth waveform undergoes two cycles within each bit cell, the first cycle terminating in a negative-going transition onequarter of the distance along the bit cell and the second cycle terminating in a negative-going transition three-quarters of the distance along the bit cell. The trigger 22 responds to the first negative-going transition of the sawtooth waveform within each bit cell to enable the associated input of the AND gate 20 and to the second negative-going transition of the sawtooth waveform within each bit cell to disable the AND gate 20. The AND gate 20 is accordingly enabled during the center half of each bit cell to pass "one" pulses to the output to the exclusion of "zero" pulses.

Figure 2:
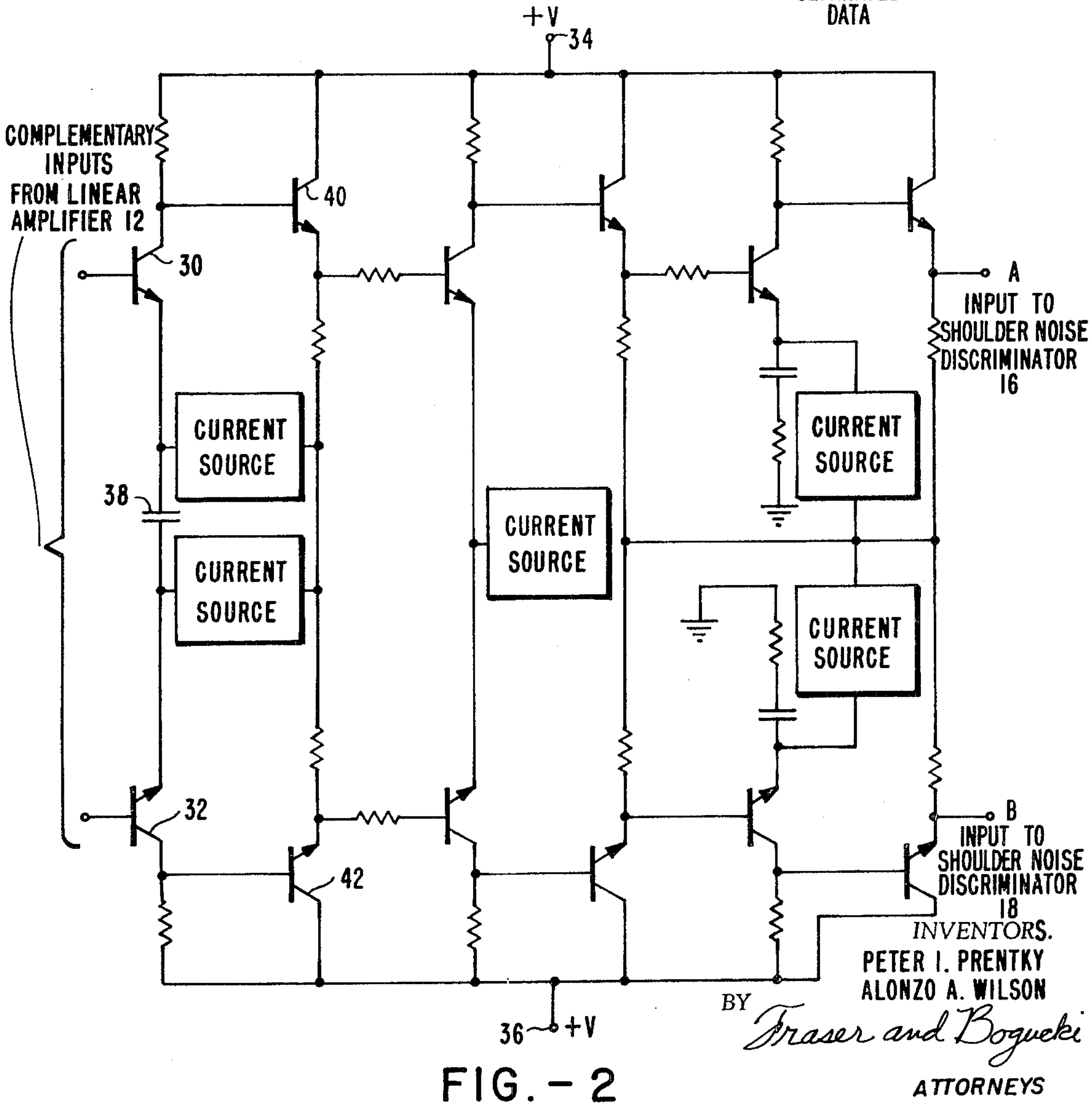
FIG. 2 is a partial block and partial schematic diagram of one arrangement of a bit detector which may be used in the arrangement of FIG. 1.

One arrangement of a bit detector 14 which may be used in the detection arrangement of FIG. 1 is illustrated in detail in FIG. 2. As previously mentioned the input stage of the bit detector 14 differentiates the complementary signals from the linear amplifier 12, while the later stages of the detector 14 square the resulting differentiated signals. In this instance the input stage includes a pair of transistors 30 and 32 respectively coupled between opposite power supply terminals 34 and 36 and a differentiating capacitor 38. The transistors 30 and 32, which are normally biased into conduction in the absence of any input signals, are biased into greater and less conduction, or vice versa, in the presence of complementary input signals from the linear amplifier 12 causing the capacitor 38 to charge accordingly. A pair of transistors 40 and 42 in the succeeding stage respond to the voltage of the capacitor 38 to provide complementary differentiated signals. The succeeding stages of the bit detector 14 overdrive or square the differentiated signals to provide them with substantially rectangular waveforms. The gains of the various stages are made relatively high and the transistors in the last several stages are driven to saturation or cut-off.

Figure 3:
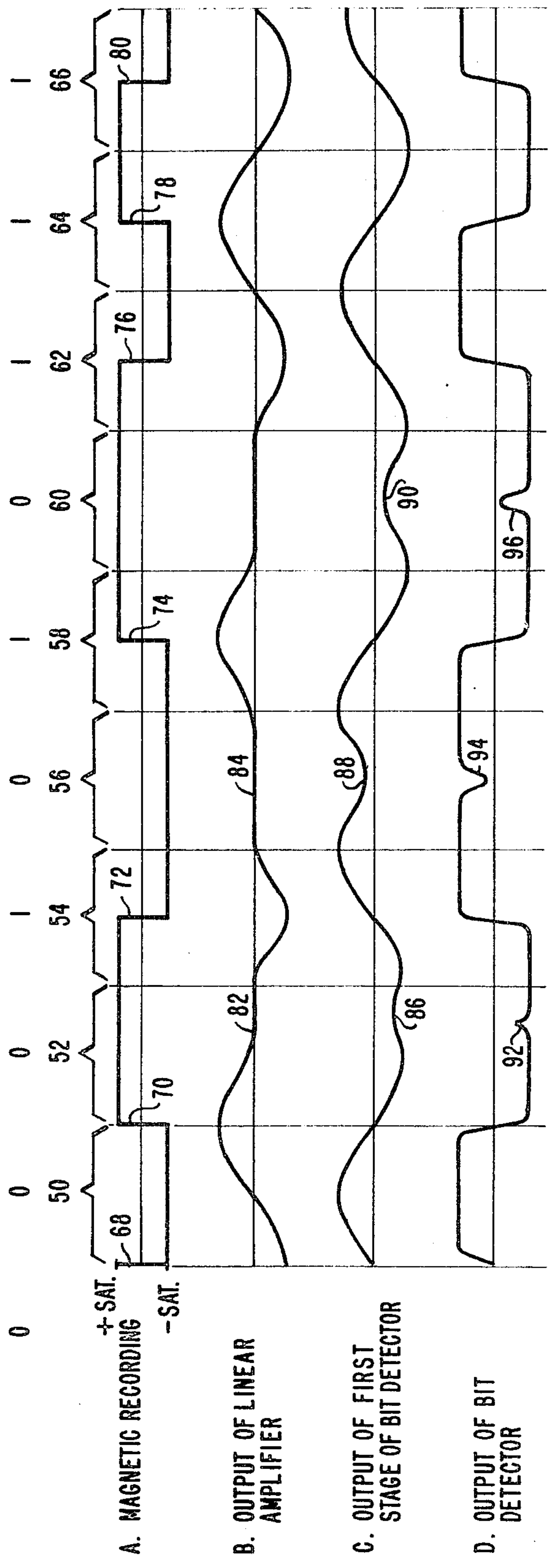
FIGS. 3A through 3D are waveforms useful in explaining the operation of the arrangements of FIGS. 1 and 2.

The manner in which the read head 10, the linear amplifier 12 and the bit detector 14 function to effectively reproduce the magnetic recording is illustrated by the waveforms shown in FIGS. 3A through 3D. FIG. 3A depicts a magnetic recording of digital or binary data which has been encoded using modified frequency modulation (MFM). The magnetic recording comprises transitions between opposite states of magnetic saturation at selected locations within a succession of substantially uniform bit cells, a plurality of such bit cells 50, 52, 54, 56, 58, 60, 62, 64 and 66 being shown. As previously mentioned MFM involves the writing of a transition at the center of each "one" bit cell, and the writing of a transition at the leading edge of each "zero" bit cell unless the "zero" bit cell in question is preceded by a "one" bit cell. Thus the first two bit cells 50, 52 representing "zeros" have transitions 68 and 70 respectively at the leading edges thereof. The following bit cell 54 which represents "one" has a transition 72 at the center thereof. The next bit cell 56 representing "zero" contains no transition since it is preceded by a "one" bit cell. The "one" bit cell 58 again has a transition 74 at the center, while the following "zero" bit cell 60 is absent any transitions. The last three bit cells 62, 64 and 66 represent "one" and have transitions 76, 78 and 80 respectively at the centers thereof.

As the magnetic read head 10 undergoes motion relative to the magnetic recording shown in FIG. 3A the recording is differentiated to provide a complementary pair of waveforms, one of such waveforms as amplified by the linear amplifier 12 being illustrated in FIG. 3B. It will be noted that the waveform of FIG. 3B has peak values in time coincidence with each of the transitions 68, 70, 72, 74, 76, 78 and 80 of the magnetic recording. The waveform slopes on the opposite sides of each peak toward the zero axis. Where adjacent transitions are spaced relatively close together, as in the case of the transitions 68 and 70 at the leading edges of the bit cells 50 and 52, the differentiated waveform generated in response to one of the transitions is affected by the adjacent transition. This produces a relatively smooth and gradual curve from one of the peaks through the zero axis to the other peak. When the resulting waveform at the output of the linear amplifier 12 is differentiated by the first stage of the bit detector 14 to provide the waveform shown in FIG. 3C, the resulting waveform extends through the zero axis at points corresponding to the peaks of the FIG. 3B waveform to a peak at points corresponding to the zero-crossings of the FIG. 3B waveform.

Where adjacent transitions of the magnetic recording are spaced further apart than one bit cell, as in the case of the transitions 70 and 72 which are spaced one and one-half bit cells apart, the resulting waveform as it extends between the two transition produced peaks may or may not have a horizontal or "shoulder" portion depending upon the resolution and quality of the magnetic read and detection apparatus. Where the resolution is relatively poor, as was the case with older systems, the waveform of the sensed signal curved gradually between the opposite peaks without any shoulder. With the increased resolution found in more recent systems however, the signal waveform may have a shoulder portion. This is particularly true where the adjacent transitions are spaced relatively far apart, such as by reason of the transitions being contained within one of the recording tracks near the outer periphery of a magnetic disk.

Assuming the resolution of the detection arrangement of FIG. 1 to be relatively good, the waveform as it extends between the peaks produced by the adjacent transitions 70 and 72 includes a relatively small shoulder 82 as shown in FIG. 3B. The following transition 74 similarly results in a shoulder 84, which shoulder is substantially larger than the shoulder 82 due to the spacing of the transition 74 from the preceding transition 72 by a distance equal to the length of two bit cells.

The shoulder portions 82 and 84 result in corresponding shoulder noise pulses 86 and 88 upon differentiation as shown in FIG. 3C. Since the zero-crossings of the differentiated signal of FIG. 3C correspond to the transitions of the magnetic recording and thereby represent the various data or "one" and clock or "zero" bits thereof, the shoulder noise pulses which dip toward the zero axis constitute unwanted noise signals which may be erroneously detected as bits depending upon their proximity to the zero axis and the type of detection arrangement used.

The differentiated signal as squared by the later stages of the bit detector 14 shown in FIG. 2 is shown in FIG. 3D. It will be noted that the FIG. 3D waveform is substantially rectangular in shape and comprises almost an exact complement of the magnetic recording of FIG. 3A. The shoulder noise pulses 86 and 88 as well as the pulse 90 provided by the relatively widely spaced apart transitions 74 and 76 of the magnetic recording are shaped so as to comprise relatively sharp spikes or pulses 92, 94 and 96 respectively in the waveform at the output of the bit detector 14.

Where prior art techniques such as threshold detection or clipping are employed to detect the valid bits, an arbitrary threshold level must be established in connection with the waveform of FIG. 3D. The threshold region must be made small enough so that relatively small but valid bit signals are detected, yet large enough so that shoulder noise pulses or spikes are excluded. As previously mentioned, use of techniques such as threshold clipping are generally undesirable because of the difficulty in maintaining a constant, desired threshold level, even when relatively expensive and complex circuitry is employed for this purpose. Despite the attendant disadvantages, however, such techniques have commonly been used with certain types of encoding such as NRZI where no shoulder noise discriminator has been available for the large transition spacings encountered.

Thus, while the closely spaced transitions 68 and 70 result in the absence of any shoulder noise pulse therebetween and the adjacent transitions 70 and 72 spaced one and one-half bit cells apart result in a relatively small noise pulse 92 which does not closely approach the zero axis, the adjacent transitions spaced two bit cells apart as in the case of the transitions 72, 74 and 76 result in pulses 94 and 96 of substantial size which may closely approach or even cross the zero axis. The use of threshold clipping in such an arrangement results in the failure to detect many of the valid bits. At the same time many of the noise pulses of substantial size are erroneously detected as bits.

Shoulder noise discriminators 16 according to the present invention eliminate the unwanted shoulder noise pulses or spikes in substantially logical fashion and without the need for undesired techniques such as threshold clipping. The logic of the discriminators is based on several observations; notably that the largest shoulder noise pulses are of considerably shorter duration than the width of a bit cell, and that if transitions of one polarity only in the two complementary data signals are assumed to represent valid bits, the valid bits alternate between the two different signals and each noise pulse occurs in both signals so as to follow the last valid bit in one signal and precede the next valid bit in the other signal. Each data signal may therefore be inverted and used to gate the same signal as delayed, and the delay may last up to one-half bit cell without interfering with the valid bits. Since the shoulder noise pulses in the present example are less than one-half bit cell in duration, those pulses which precede valid bits may be eliminated by delaying both data signals for a period of time at least equal to the width of the noise pulses prior to gating. Based on the fact that a valid bit within a given one of the data signals cannot occur before a predetermined minimum time lapse after the occurrence of the prior valid bit within the same signal, each data signal as gated may be inhibited for a selected period of time to eliminate noise pulses occurring after valid bits.

Figure 4:
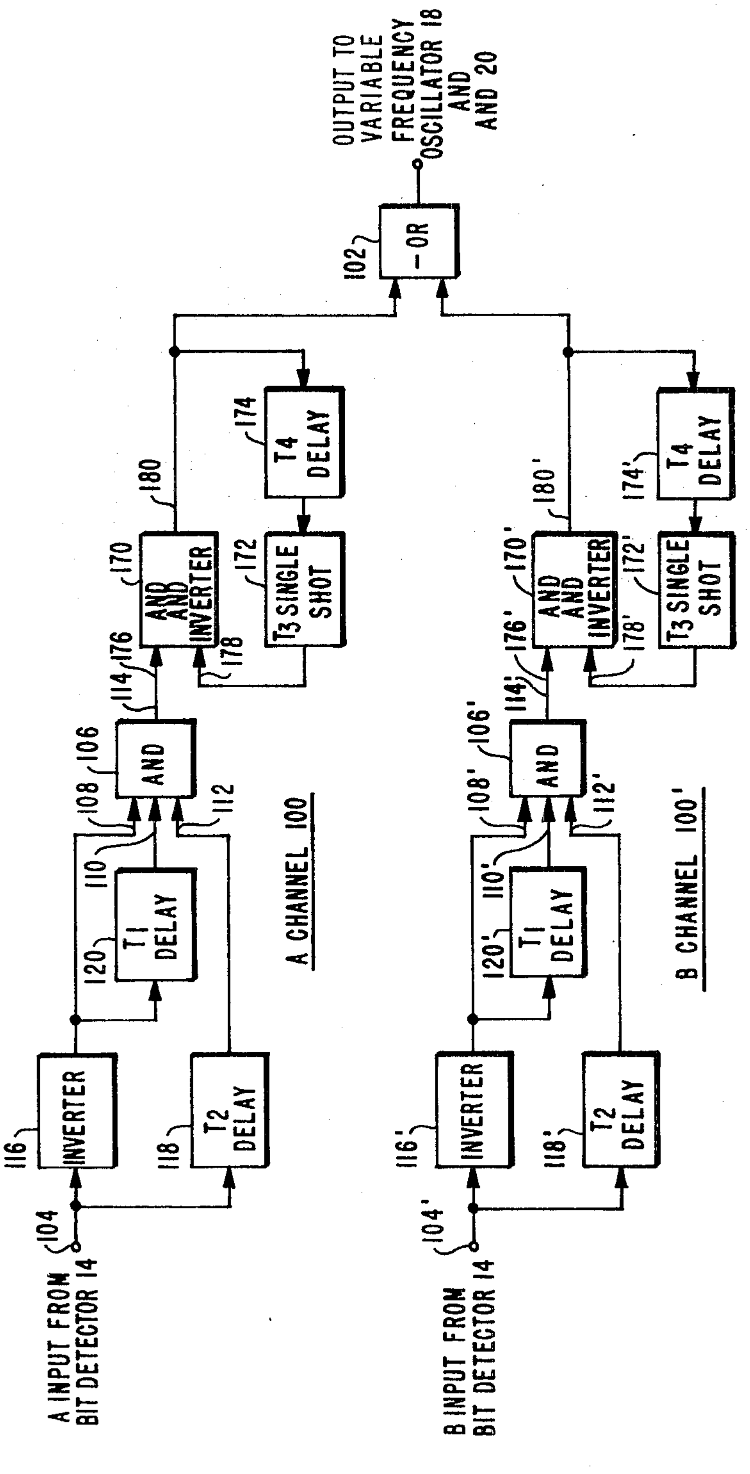
FIG. 4 is a block diagram of a preferred arrangement of a shoulder noise discriminator according to the invention.
Figure 5:
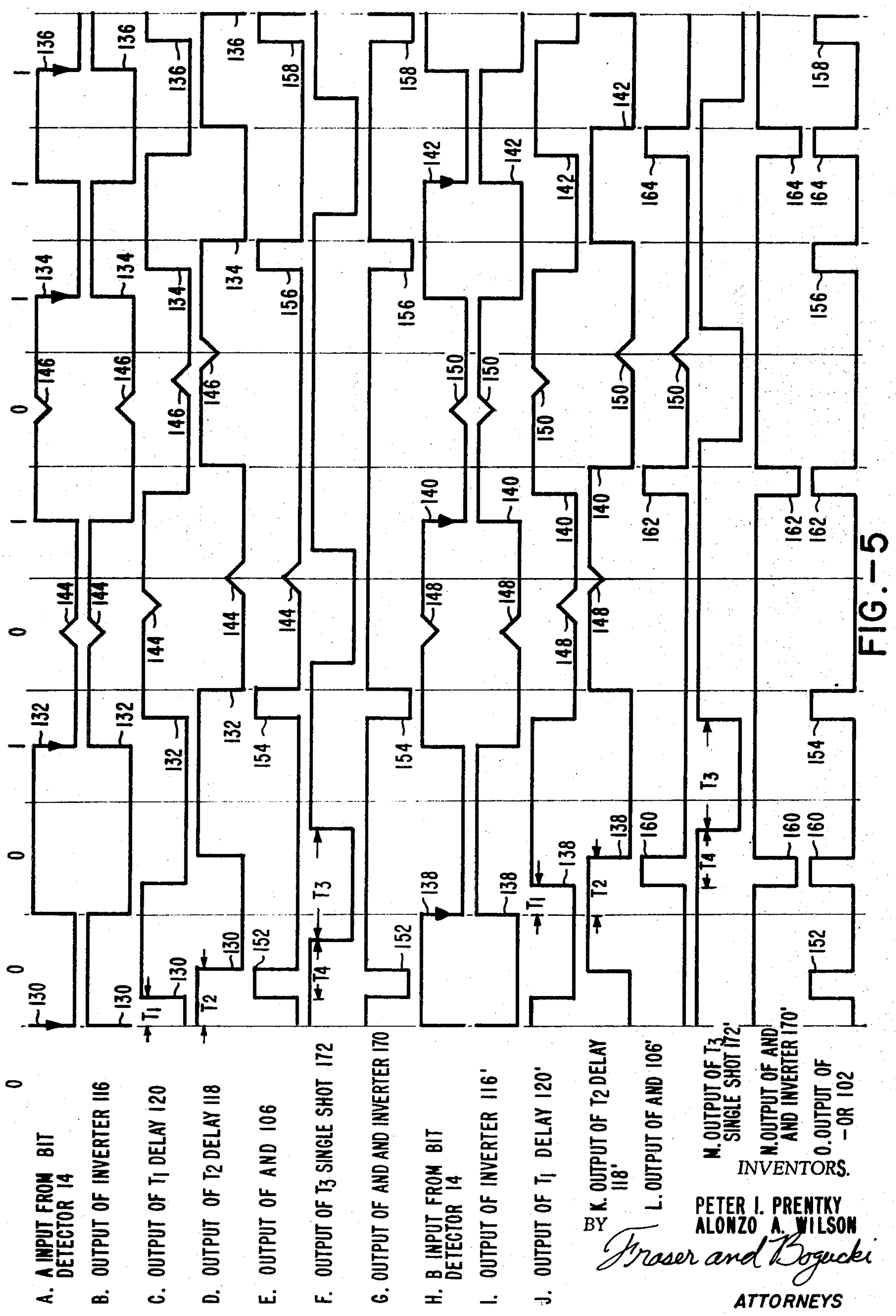
FIGS. 5A through 5O are waveforms useful in explaining the operation of the arrangement of FIG. 4.

One preferred arrangement of the shoulder noise discriminator 16 is shown in detail in FIG. 4 with the corresponding waveforms thereof being illustrated in FIGS. 5A through 5O. The arrangement of FIG. 4 includes a pair of symmetrical complementary A and B channels 100 and 100′, the outputs of which are coupled to the opposite inputs of a negative OR circuit 102 and the input terminals 104 and 104′ of which are coupled to receive the true and complementary values of the data signal appearing at the outputs of the bit detector 14. The A and B channels 100 and 100′ are identical in configuration, and the various components of the B channel corresponding to those of the A channel are designated by the same reference numerals except that they bear a prime (′). The channels 100, 100′ include first AND gates 106, 106′ having three different inputs 108, 108′, 110, 110′ and 112, 112′, and an output 114, 114′. The input terminals 104, 104′ are coupled to the first AND gate inputs 108, 108′ through inverters 116, 116′ and to the third AND gate inputs 112, 112′ through T2 delay circuits 118, 118′. The second AND gate inputs 110, 110′ are coupled to the outputs of the inverters 116, 116′ through T1 delay circuits 120, 120′.

Complementary data signals corresponding to the signal of FIG. 3D and as shown in idealized fashion in FIGS. 5A and 5H are applied to the channel inputs 104, 104′. The channels 100, 100′ respond to the negative-going transitions of the signals to the exclusion of the positive-going transitions, the valid negative-going bit signals being illustrated by arrowheads in FIGS. 5A and 5H. It will be noted that since the signals of FIGS. 5A and 5H are complementary, the valid bit signals as provided by the negative-going transitions alternate between the two different channels 100, 100′. Thus the signal of FIG. 5A includes the valid bit transitions or signals 130, 132, 134 and 136 while the complementary signal of FIG. 5H includes the valid bit transitions or signals 138, 140 and 142. The input data signal of FIG. 5A includes the noise pulses or spikes 144 and 146 corresponding to the pulses 94 and 96 of FIG. 3D, the relatively small pulse corresponding to the pulse 92 of FIG. 3D having been omitted from FIG. 5A for the sake of simplicity. Similarly the input data signal of FIG. 5H includes noise pulses or spikes 148 and 150 corresponding to the pulses 94 and 96 of FIG. 3D.

The input data signals of FIGS. 5A and 5H as inverted by the inverters 116, 116′ are shown in FIGS. 5B and 5I respectively. These inverted signals are applied directly to the first AND gate inputs 108, 108′, and to the second inputs 110, 110′ after being delayed by a time T1 in the delay circuits 120, 120′, the signals as delayed being illustrated in FIGS. 5C and 5J. The time delay T1 is chosen to be at least equal to the width of the shoulder noise pulses. In the present example the shoulder noise pulses 144, 146, 148 and 150 are assumed to have a maximum width or duration on the order of one-fourth the duration of a bit cell. T1 is therefore chosen to be equal to one-fourth the duration of a bit cell, and the valid bit transitions 130, 132, 134, 136, 138, 140 and 142 are delayed by this amount prior to being applied to the second AND gate inputs 110, 110′.

The input data signals as inverted by the inverters 116, 116′ and as shown in FIGS. 5B and 5I enable the first AND gates 106, 106′ from a time just prior to the arrival of the valid bit transitions to pass the transitions to the outputs 114, 114′. Shoulder noise pulses, such as the pulses 146 and 148 occurring shortly prior to valid bit transitions are blocked and thereby eliminated since the first AND gates 106, 106′ are not enabled by the inverted data signals until shortly after the occurrence of these pulses. However, the shoulder noise pulses 144 and 150 occurring shortly after valid bit transitions are passed to the gate outputs 114, 114′ since the AND gates remain enabled for at least one bit cell period so as to be enabled during their occurrence.

The T2 delay circuits 118, 118′ delay the input data signals for a period of time T2 greater than the time delay T1 to provide pulses of selected duration in time coincidence with each of the valid bit transitions at the first AND gates 106, 106′. As shown in FIG. 5E the waveforms of FIGS. 5C and 5D combine at the first AND gate 106 to provide pulses 152, 154, 156 and 158 of duration T2 – T1 in time coincidence with the valid bit transitions 130, 132, 134 and 136 respectively. Similarly the waveforms of FIGS. 5J and 5K combine to produce pulses 160, 162 and 164 as shown in FIG. 5L in time coincidence with the valid bit transitions 138, 140 and 142 respectively. In the present example the delay T2 is chosen to be equal to one-half the duration of a bit cell providing the pulses with a duration equal to one-fourth the duration of a bit cell. It will also be noted from FIGS. 5E and 5L that the shoulder noise pulses 146 and 148 are blocked by the first AND gates 106 and 106′ respectively, while the pulses 144 and 150 are passed by the first AND gates for the reasons discussed above.

In accordance with the invention the outputs of the A and B channels 100, 100′ are inhibited a selected period of time after the occurrence of each valid bit pulse to block noise pulses such as the pulses 144 and 150 occurring after valid bits. The channels are inhibited by circuitry which includes a second AND gate 170, 170′ comprising an AND circuit and inverter, a pulse generator in the form of a T3 single shot circuit 172, 172′, and a T4 delay circuit 174, 174′. The second AND gates 170, 170′ have a first input 176, 176′ coupled to the first AND gate output 114, 114′, a second input 178, 178′ coupled to the outputs of the T3 single shot circuit 172, 172′, and an output 180, 180′ coupled to the input of the T4 delay circuit 174, 174′ as well as to the negative OR circuit 102. The output of the T4 delay circuit 174, 174′ is coupled to the input of the T3 single shot circuit 172, 172′. The T3 single shot circuit 172, 172′ responds to each valid bit pulse passed by the second AND gate 170, 170′ after a delay T4 as provided by the delay circuit 174, 174′ to generate an inhibit pulse of duration T3, the inhibit pulse inhibiting the second AND gate 170, 170′ to block and thereby eliminate shoulder noise pulses which follow valid bit pulses.

The outputs of the second AND gates 170 and 170′ as inverted are illustrated in FIGS. 5G and 5N respectively, and the outputs of the T3 single shot circuits 172 and 172′ are illustrated in FIGS. 5F and 5M respectively. As shown in FIG. 5F, the output of the second AND gate 170 is delayed by the time T4 prior to initiating the inhibit pulse of duration T3 via the single shot circuit 172. The delay T4, which is conveniently chosen to equal one-half the duration of a bit cell in the present example, allows the valid bit pulses to pass the second AND gates prior to the inhibiting of the gates. Since the next valid bit pulse in a given channel cannot occur for at least two bit intervals after the previous valid bit pulse in that channel, the second AND gates 170, 170′ can be inhibited over the remainder of the bit cell in which a valid bit pulse has occurred and over a portion of the immediately following bit cell to eliminate shoulder noise pulses which may follow the valid bit pulses. In the present example the duration T3 of the inhibit pulses is conveniently chosen to equal the duration of a bit cell. Accordingly, the shoulder noise pulse 144 at the output of the first AND gate 106 in the A channel 100 is blocked at the second AND gate 170 by the T3 inhibit pulse from the single shot circuit 172. Similarly the shoulder noise pulse 150 appearing at the output of the first AND gate 106' in the B channel 100' is blocked at the second AND gate 170' by the T3 inhibit pulse from the single shot circuit 172'.

As shown in FIGS. 5G and 5N the valid bit pulses 152, 154, 156, 158, 160, 162 and 164 are passed to the inputs of the negative OR circuit 102 to the exclusion of the shoulder noise pulses. The pulses are combined at the output of the negative OR circuit 102 as shown in FIG. 5O, and the resulting combination is separated into "one" pulses and "zero" pulses by the variable frequency oscillator 18, AND gate 20 and trigger 22 shown in FIG. 1 and described in connection therewith.

Figure 6:
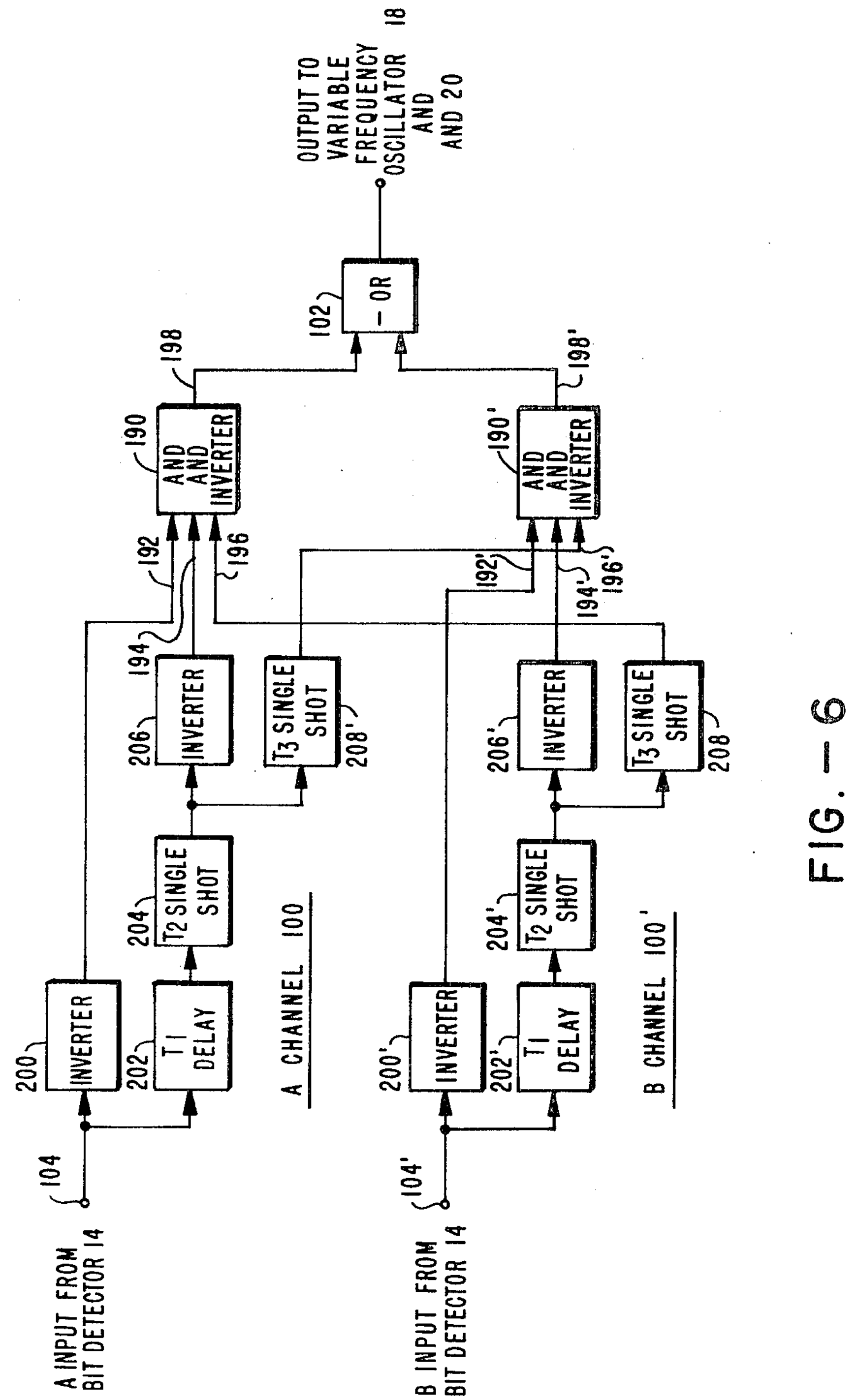
FIG. 6 is a block diagram of an alternative arrangement of a shoulder noise discriminator according to the invention.
Figure 7:
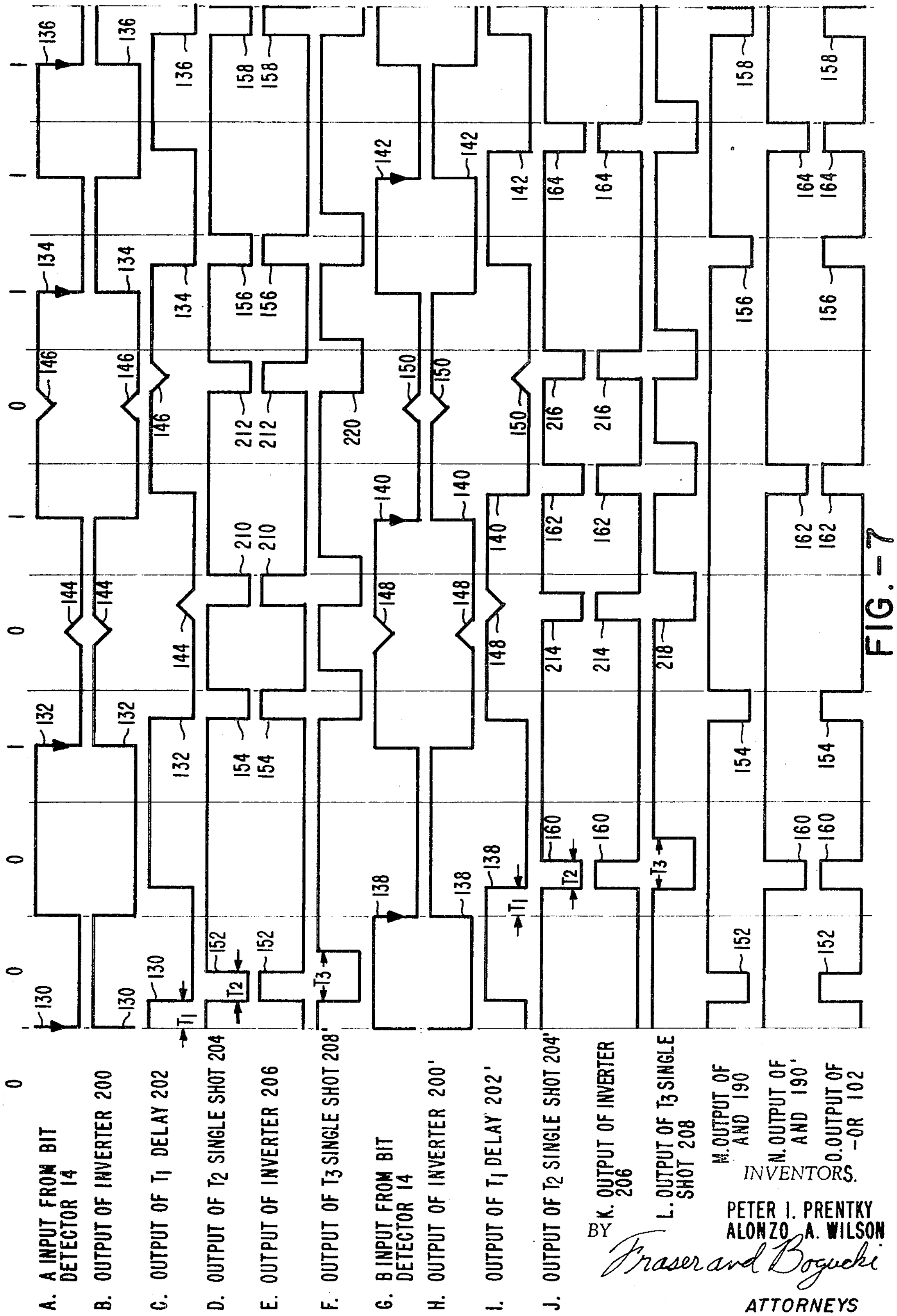
FIGS. 7A through 7O are waveforms useful in explaining the operation of the arrangement of FIG. 6.

An alternative form of shoulder noise discriminator 16 according to the invention is shown in FIG. 6 with the corresponding waveforms therefrom being illustrated in FIGS. 7A through 7O. The FIG. 6 arrangement is similar to that of FIG. 4 and includes the symmetrical complementary A and B channels 100, 100' having input terminals 104, 104' and outputs coupled to the opposite inputs of the negative OR circuit 102. The internal arrangement of the channels 100, 100' is different, however, from that of FIG. 4 and includes a single AND gate 190, 190' having three different inputs 192, 192', 194, 194' and 196, 196', and an output 198, 198' coupled to the negative OR circuit 102. The first input 192, 192' of each AND gate 190, 190' is coupled to the channel input terminal 104, 104' via an inverter 200, 200'. The second input 194, 194' of each AND gate 190, 190' is coupled to the channel input 104, 104' via a T1 delay circuit 202, 202', a T2 pulse generator in the form of a single shot circuit 204, 204' and an inverter 206, 206'. The third input 196, 196' of each AND gate 190, 190' is coupled to the output of the T2 single shot circuit 204', 204 in the opposite channel via a T3 single shot circuit 208', 208.

The input data signals appearing at the input terminals 104, 104' and which are illustrated in FIGS. 7A and 7G are identical to those of FIGS. 5A and 5H. These signals are delayed by the T1 delay circuits 202, 202' prior to being applied to the T2 single shot circuits 204, 204'. Again, the delay T1 is chosen to be at least equal to the width of the noise pulses, or one-fourth the duration of a bit cell in the present example, and the input data signals as so delayed are illustrated in FIGS. 7C and 7I. The single shot circuits 204, 204' respond to each negative-going transition at the output of the T1 delays 202, 202' to generate a pulse of width T2. Again the pulse width T2 is chosen to equal one-fourth the duration of a bit cell for convenience. Thus the pulses at the output of the T2 single shot circuits 204, 204' correspond to the outputs of the first AND gates 106, 106' in the FIG. 4 arrangement as shown in FIGS. 7D and 7J. In addition, however, the FIG. 6 arrangement responds to the negative-going portion of each shoulder noise pulse to provide a corresponding pulse of duration equal to one-fourth that of a bit cell at the output of the T2 single shot circuits 204, 204'. As shown in FIG. 7D the noise pulses 144 and 146 result in pulses 210 and 212 respectively. Similarly, as shown in FIG. 7J the noise pulses 148 and 150 result in the generation of pulses 214 and 216 respectively.

The pulses provided at the outputs of the T2 single shot circuits 204 and 204' are inverted by the inverters 206, 206' and applied to the second inputs 194, 194' of the AND gates 190, 190', the pulses as inverted being illustrated in FIGS. 7E and 7K. As in the arrangement of FIG. 4 the input data signals are inverted by the inverters 200, 200' and applied to the first inputs 192, 192' of the AND gates 190, 190' to enable each of the AND gates shortly prior to the arrival of a valid bit pulse, the inverted data signals being shown in FIGS. 7B and 7H. The inhibiting of the AND gates 190, 190' until a time shortly prior to the arrival of a valid bit pulse eliminates noise pulses occurring shortly prior to the valid bit pulses. Thus, as can be seen in FIGS. 7M and 7N which illustrate the respective outputs of the AND gates 190 and 190', the output of the inverter 200 in the A channel 100 is low prior to the valid bit transition 134 thereby inhibiting the AND gate 190 until a time shortly prior to the arrival of the valid bit pulse 156 to block the noise generated pulse 212. Similarly the output of the inverter 200' in the B channel 100' is low until the occurrence of the valid bit transition 140 thereby disabling the AND gate 190' until a time shortly prior to the arrival of the valid bit pulse 162 to block the noise generated pulse 214.

In the absence of further inhibiting means the noise generated pulses 210 and 216 which occur shortly after valid bit pulses would be erroneously passed to the channel outputs. To avoid this the T3 single shot circuits 208', 208 are employed to inhibit the AND gate 190, 190' in the opposite channel for a period of time T3 after the occurrence of a pulse within the same channel. As shown in FIGS. 7F and 7L the T3 single shot circuits 208', 208 respond to the leading edge of each pulse produced by the associated T2 single shot circuit 204, 204' to generate an inhibit pulse of selected width T3 equal to approximately seven-sixteenths the duration of a bit cell in the present example. The effectiveness of the T3 single shot circuits 208', 208 is based on the observation that a T2 noise pulse generated in one channel will precede or follow the T2 noise pulse generated in the other channel by a time distance no greater than one-half the width of the noise pulse, whereas a valid bit pulse generated in either of the channels will precede as well as follow the valid bit pulses in the other channel by at least the length of a bit cell. The occurrence of a T2 noise pulse in one channel before or after the occurrence of a T2 noise pulse in the other channel is due to the fact that the shoulder noise spikes or pulses in the two different channels are complementary and the T2 pulses generated as a result thereof are initiated upon the occurrence of the negative-going portions of the noise pulses.

Thus it will be observed from FIGS. 7E and 7K that the noise generated pulse 214 in the B channel 100' precedes the noise generated pulse 210 in the A channel 100 by approximately one-half the width of the pulses, or one-eighth the duration of a bit cell. Similarly the noise pulse 212 in the A channel 100 precedes the noise pulse 216 in the B channel 100' by approximately one-eighth the duration of a bit cell. In each case the first noise pulses to occur (in the present example the pulses 212 and 214) are eliminated at the AND gates 190, 190' by the input data signals as inhibited by the inverters 200, 200' without the need for the T3 single shot circuits 208', 208. The T3 single shot circuits 208', 208 are then employed to inhibit the AND gate in the other channel and thereby block the later occurring noise pulse in the other channel. The inhibit pulses of duration T3 take into account the delay of noise pulses in one channel relative to the other channel as well as the duration of the noise pulses. As shown in FIG. 7L the T3 inhibit pulse 218 occurring at the output of the T3 single shot circuit 208 in response to the occurrence of the noise pulse 214 in the B channel 100' coincides in time with the noise pulse 210 in the opposite A channel 100 to block the noise pulse 210 from the output of the AND gate 190. Similarly, as shown in FIG. 7F, the T3 inhibit pulse 220 appearing at the output of the T3 single shot circuit 208' in response to the occurrence of the noise pulse 212 in the A channel 100 coincides in time with the corresponding noise pulse 216 in the opposite B channel 100' to block the noise pulse 216 from the output of the AND gate 190'.

As shown in FIGS. 7M and 7N the AND gates 190 and 190' comprise negative AND circuits which invert the pulses at the second inputs 194 and 194' thereto. The negative OR circuit 102 also inverts the pulses at the outputs of the AND gates 190, 190' as well as combining them to provide the series of pulses shown in FIG. 7O. The various "one" and "zero" pulses at the output of the negative OR circuit 102 may be separated by the apparatus illustrated in FIG. 1.

Figure 8:
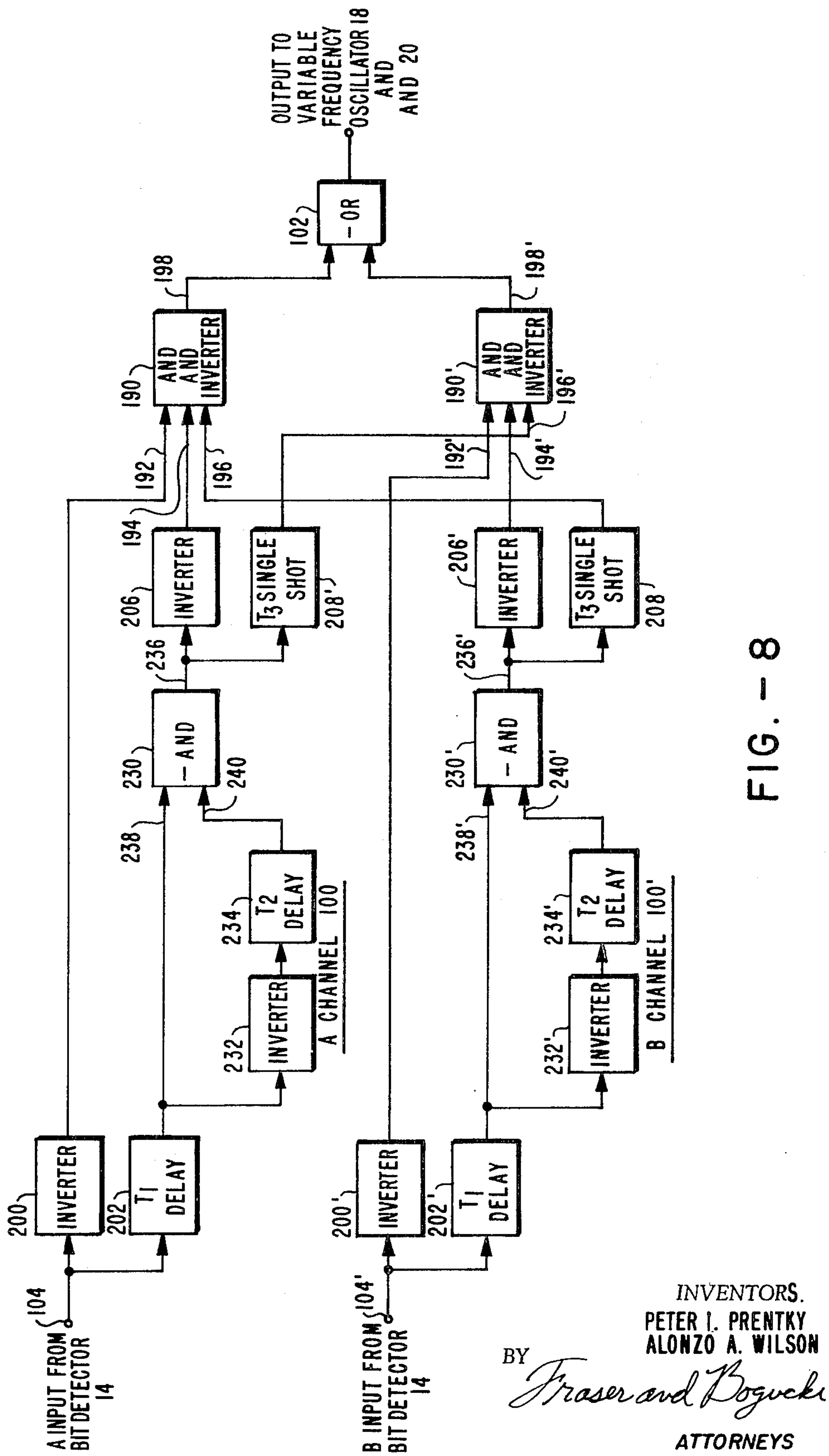
FIG. 8 is a block diagram of another alternative arrangement of a shoulder noise discriminator according to the invention.

A modification of the shoulder noise discriminator of FIG. 6 is illustrated in FIG. 8. The two arrangements are identical except that in the FIG. 8 arrangement the T2 single shot circuits 204 and 204' of FIG. 6 are replaced by an AND gate 230, 230', an inverter 232, 232' and a T2 delay circuit 234, 234'. Each AND gate 230, 230' has an output 236, 236' coupled to the inputs of the inverter 206, 206' and the T3 single shot circuit 208', 208, a first input 238, 238' coupled directly to the output of the T1 delay circuit 202, 202', and a second input 240, 240' coupled to the output of the T1 delay circuit 202, 202' via the inverter 232, 232' and the T2 delay circuit 234, 234'.

Figure 9:
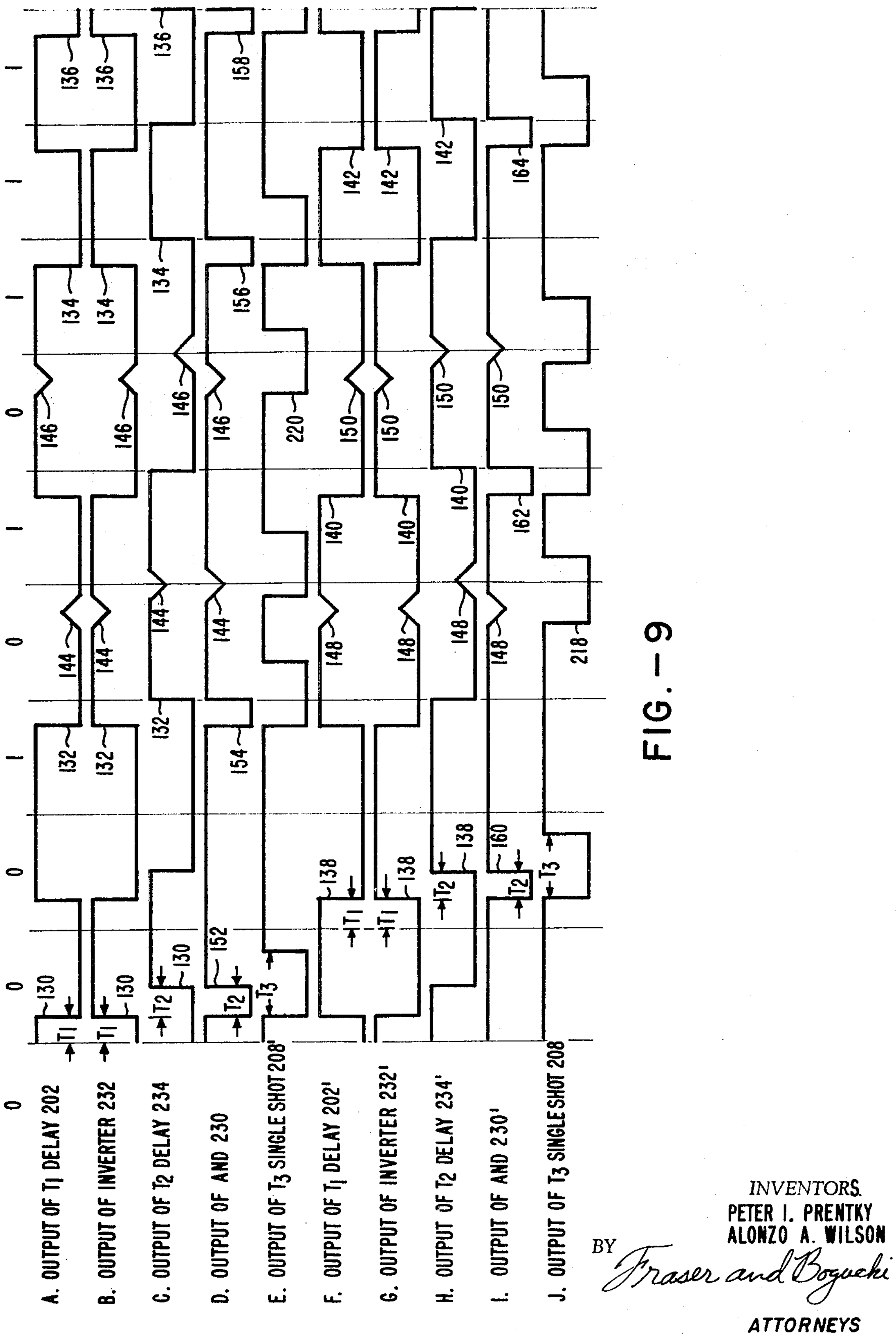
FIGS. 9A—9J are waveforms useful in explaining the operation of the arrangement of FIG. 8.

The signals at the outputs of the T1 delay circuits 202 and 202' which are shown in FIGS. 9A and 9F respectively and which are the same as the signals depicted in FIGS. 7C and 7I are inverted by the inverters 232 and 232' as shown in FIGS. 9B and 9G and delayed a time T2 by the delay circuits 234 and 234' as shown in FIGS. 9C and 9H. The signals appearing at the outputs of the T2 delay circuits 234 and 234' are combined in the AND gates 230 and 230' with the signals from the outputs of the T1 delay circuits 202 and 202' to provide pulses as shown in FIGS. 9D and 9I. The width of the pulses is determined by the T2 delay, and in the present example is conveniently chosen to equal one-fourth the duration of a bit cell. It will be noted that the pulses appearing at the outputs of the AND gates 230 and 230' are identical to those provided by the T2 single shot circuits 204 and 204' in the FIG. 6 arrangement and shown in FIGS. 7D and 7J except that the shoulder noise pulses 144, 146, 148 and 150 pass through the AND gates in their original form instead of as pulses of rectangular waveform.

As in the case of the FIG. 6 arrangement the noise pulses 146 and 148 are blocked at the AND gates 190 and 190' of the FIG. 8 arrangement without the need for the T3 inhibit pulses provided by the single shot circuits 208' and 208. The output pulses of the T3 single shot circuits 208' and 208 are illustrated in FIGS. 9E and 9J, and in the present example have a width approximately equal to nine-sixteenths the duration of a bit cell. The inhibit pulse 218 as provided by the single shot circuit 208 in the B channel 100' coincides in time with the noise pulse 144 in the A channel 100 to block the pulse 144 at the AND gate 190. Similarly the inhibit pulse 220 provided by the T3 single shot circuit 208' in the A channel 100 coincides in time with the noise pulse 150 in the B channel 100' to block the pulse 150 at the AND gate 190'.

The particular one of the discriminator arrangements of FIGS. 4, 6 and 8 selected for use in a detection system depends on economic considerations including the availability and cost of the various component parts of each arrangement. A further consideration, however, is the reliability with which bit signals of substantial amplitude are produced by the particular encoding and decoding system used. Thus a surface defect in the magnetic recording medium or the magnetic read head being off center relative to the recording track may result in bit signals of relatively low amplitude. One partial solution to this problem is to increase the gain of the later stages of the bit detector 14. However even this measure may not be sufficient to provide all bit signals with a minimum acceptable amplitude.

The discriminator arrangement of FIG. 4 is preferred for most applications since the inhibit functions at the channel outputs are triggered by valid bit pulses which have already arrived at the outputs, thereby allowing relatively small or narrow yet valid bits to pass through. The FIG. 6 detection introduces a signal amplitude threshold to the extent that a small but valid bit transition may not trigger the T2 single shot circuits 204 and 204'. The FIG. 8 detection arrangement remedies this problem, at least in part, by allowing small but valid transitions to pass to the output if they are too small to trigger the T3 single shot circuits 208' and 208. If, however, the valid transitions are equal to or less than one-fourth the duration of a bit cell, but large enough to trigger the T3 single shot circuits, they will be blocked.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A circuit for eliminating noise signals from a succession of binary bit signals comprising:
   a pair of channel means for passing bit signals between input and output ends thereof:
   separate first gating means associated with each of the pair of channel means for delaying the bit signals passed to the associated channel means by a period of time at least equal to the time duration of the noise signals to block noise signals occurring prior to the bit signals from the output end; and
   separate second gating means associated with each of the pair of channel means for inhibiting the passage of bit signals to the output end of the associated channel means for a selected period of time to block noise signals occurring after the bit signals from the output end;
   wherein the binary bit signals comprise transitions through zero of the waveform of a modified frequency modulated data signal having a succession of substantially uniform bit cells, the waveform of the data signal having a transition through zero substantially at the midpoint of each bit cell representing binary "1" and substantially at the leading edge of each bit cell which represents binary "0" and which is not preceded by a bit cell having a transition through zero at the midpoint thereof.

2. A circuit for eliminating noise signals from a succession of binary bit signals comprising:
   a pair of channel means for passing bit signals between input and output ends thereof;
   separate first gating means associated with each of the pair of channel means for delaying the bit signals passed to the associated channel means by a period of time at least equal to the time duration of the noise signals to block noise signals occurring prior to the bit signals from the output end; and
   separate second gating means associated with each of the pair of channel means for inhibiting the passage of bit signals to the output end of the associated channel means for a selected period of time to block noise signals occurring after the bit signals from the output end;
   wherein the bit signals are derived from a data signal, the data signal being differentiated to provide a differentiated signal having zero-crossings corresponding to the peaks of the data signal and the differentiated signal being squared to provide a squared signal having bit indicating transitions of substantial slope between opposite signal levels at the zero-crossings thereof which comprise the bit signals, and further including means responsive to the bit signals at the output ends of the channel means for separating the signals into "ones" and "zeros".

3. A circuit for eliminating noise signals from a succession of binary bit signals comprising:
   a pair of channel means for passing bit signals between input and output ends thereof;
   means responsive to the bit signals and coupled to the pair of channel means for alternately passing the bit signals to the input ends of the two different channel means;
   means associated with one of the pair of channel means for delaying the bit signals passed thereto by a period of time at least equal to the time duration of the noise signals to block noise signals occurring prior to the bit signals from the output end; and
   means associated with both of the pair of channel means for inhibiting the output end of the other one of the pair of channel means for a selected period of time in response to the occurrence of each bit signal in the one of the pair of channel means to block noise signals occurring after the bit signals from the output end of the other one of the pair of channel means;

wherein the bit signals are derived from a data signal, the data signal being differentiated to provide a differentiated signal having zero-crossings corresponding to the peaks of the data signal and the differentiated signal being squared to provide a squared signal having bit indicating transitions of substantial slope between opposite signal levels at the zero-crossings thereof which comprise the bit signals, and further including means responsive to the bit signals at the output ends of the channel means for separating the signals into "ones" and "zeros".

4. The invention defined in claim 3 above, wherein the binary bit signals comprise transitions through zero of the waveform of a modified frequency modulated data signal having a succession of substantially uniform bit cells, the waveform of the data signal having a transition through zero substantially at the midpoint of each bit cell representing binary "one" and substantially at the leading edge of each bit cell which represents binary "zero" and which is not preceded by a bit cell having a transition through zero at the midpoint thereof.

5. The invention defined in claim 4 above, wherein the inhibiting means includes gating means coupled to pass bit signals in the other one of the pair of channel means to the output end thereof except when inhibited, means for generating an inhibit signal of selected duration when initiated, the inhibit signal inhibiting the gating means when generated, and means responsive to the occurrence of each bit signal in the one of the pair of channel means for initiating the inhibit signal generating means to generate an inhibit signal, the inhibit signal being initiated within the bit cell in which the bit signal occurs and terminating within the immediately following bit cell.

6. A circuit for eliminating noise pulses from a digital data signal, the data signal having a succession of data and clock bits in the form of transitions between two different levels thereof, comprising:

first and second channels having input and output ends;

means for combining signals appearing at the output ends of the first and second channels;

means for providing the data signal to the input end of the first channel; and means for providing the complement of the data signal to the input end of the second channel;

the first and second channels each including first gating means coupled to the output end thereof, means responsive to the signal at the input end thereof for enabling the first gating means whenever the signal at the input end assumes a selected value, means coupled to the first gating means and responsive to the signal at the input end thereof for delaying the signal by a first time period at least equal to the time duration of the noise pulses, means coupled to the first gating means and responsive to the signal at the input end of the channel for delaying the signal by a second time period greater than said first time period, the signal as delayed by the second time period combining at the first gating means with the signal as delayed by the first time period to produce pulses of selected duration in response to transitions of a given sense of the signal at the input end of the channel, second gating means coupled between the first gating means and the output end of the channel, the second gating means being normally enabled to pass pulses from the first gating means to the output end of the channel, and means associated with the second gating means and responsive to each occurrence of a pulse at the second gating means for inhibiting the second gating means for a third time period thereafter.

7. A circuit for eliminating noise pulses from a digital data signal, the data signal having a succession of data and clock bits in the form of transitions between two different levels thereof, comprising:

first and second channels having input and output ends;

means for combining signals appearing at the output ends of the first and second channels;

means for providing the data signal to the input end of the first channel; and means for providing the complement of the data signal to the input end of the second channel;

the first and second channels each including gating means coupled to the output end thereof, means responsive to the signal at the input end thereof for enabling the gating means whenever the signal at the input end assumes a selected value, means coupled to the gating means and responsive to the signal at the input end thereof for delaying the signal by a first time period at least equal to the time duration of the noise pulses, means coupled between the gating means and the delaying means for providing a pulse of selected duration equal to a second time period to the gating means in response to each transition of a given sense of the signal as delayed by the delaying means, and means coupled to the gating means of the opposite channel and responsive to each pulse of selected duration to inhibit the gating means for a third time period.

8. A circuit for eliminating noise pulses from a digital data signal, the data signal having a succession of data and clock bits in the form of transitions between two different levels thereof, comprising:

first and second channels having input and output ends;

means for combining signals appearing at the output ends of the first and second channels;

means for providing the data signals to the input end of the first channel; and means for providing the complement of the data signal to the input end of the second channel;

the first and second channels each including first gating means coupled to the output end thereof, means responsive to the signal at the input end thereof for enabling the first gating means whenever the signal at the input end assumes a selected value, first delaying means coupled to the first gating means and responsive to the signal at the input end thereof for delaying the signal by a first time period at least equal to the time duration of the noise pulses, second gating means coupled between the first gating means and the first delaying means, and second delaying means coupled between the first delaying means and the second gating means for delaying the signal from the first delaying means by a second time period, the signal as delayed by the second time period combining at the second gating means with the signal as delayed by the first time period to produce pulses of selected duration in response to transitions of a given sense of the signal from the first delaying means.

9. The invention defined in claim 8 above, wherein each of the first and second channels includes means coupled to the first-mentioned gating means of the opposite channel and responsive to each pulse of selected duration to inhibit the first-mentioned gating means for a third time period.

10. A noise discriminator for eliminating noise pulses from a digital data signal, the data signal comprising a complementary pair of signals representing data and clock bits by transitions between opposite signal levels at the centers and leading edges of selected ones of a succession of arbitrarily defined bit cells, comprising:

a pair of symmetrical complementary channels having output terminal means and input terminal means coupled to receive different ones of the complementary pair of signals; and signal summing means coupled to the output terminal means of the pair of channels;

each of the pair of channels including a first AND gate having first, second and third inputs and an output, an inverter having an output coupled to the first input of the first AND gate and an input coupled to the input terminal means of the channel, first delay means coupled between the second input of the first AND gate and the output of the inverter, second delay means coupled between the third input of the first AND gate and the input terminal means of the channel, a second AND gate having a first input coupled to the output of the first AND gate, a second input, and an output coupled to the output terminal means of the channel, pulse generating means having an input, and an output coupled to the second input of the second AND gate, the pulse generating means providing a pulse of selected duration to the output thereof in response to a signal at the input thereof, and third delay means coupled between the output of the second AND gate and the input of the pulse generating means.

11. The invention defined in claim 10 above, wherein the first delay means delays signals applied thereto for a period of time at least equal to the time duration of the noise pulses and less than half the time duration of the bit cells, the second delay means delays signals applied thereto for a period of time greater than that of the first delay means, and the third delay means and the duration of pulses provided by the pulse generating means are selected so as to inhibit the second AND gate during a portion of the bit cell in which a signal at the output of the second AND gate occurs and during a portion of the immediately following bit cell.

12. A noise discriminator for eliminating noise pulses from a digital data signal, the data signal comprising a complementary pair of signals representing data and clock bits by transitions between opposite signal levels at the centers and leading edges of selected ones of a succession of arbitrarily defined bit cells, comprising:

a pair of symmetrical complementary channels having output terminal means, and input terminal means coupled to receive different ones of the complementary pair of signals; and signal summing means coupled to the output terminal means of the pair of channels;

each of the pair of channels including an AND gate having first, second and third inputs, and an output coupled to the output terminal means of the channel, a first inverter coupled between the first input of the AND gate and the input terminal means of the channel, delay means having an output, and an input coupled to the input terminal means of the channel, first pulse generating means having an output, and an input coupled to the output of the delay means, the first pulse generating means providing a first pulse of selected duration to the output thereof in response to a signal at the input thereof, a second inverter coupled between the second input of the AND gate and the output of the first pulse generating means, and second pulse generating means coupled between the output of the first pulse generating means and the third input of the AND gate in the opposite channel, the second pulse generating means providing a second pulse of selected duration to the corresponding input of the AND gate in the opposite channel in response to the presence of a first pulse at the output of the first pulse generating means.

13. The invention defined in claim 12 above, wherein the first pulse generating means comprises a single shot multivibrator.

14. The invention defined in claim 12 above, wherein the first pulse generating means comprises a second AND gate having a first input coupled to the output of the delay means, a second input, and an output coupled to the second inverter and to the second pulse generating means, a third inverter having an output, and an input coupled to the output of the delay means, and a second delay means coupled between the output of the third inverter and the second input of the second AND gate.

15. The invention defined in claim 12 above, wherein the delay means delays signals applied thereto for a period of time at least equal to the time duration of the noise pulses and less than half the time duration of the bit cells, and the duration of each of the second pulses from the second pulse generating means is at least equal to one and one-half times the time duration of the noise pulses.

* * * * *